US012437946B2

(12) United States Patent
Ziegler et al.

(10) Patent No.: US 12,437,946 B2
(45) Date of Patent: Oct. 7, 2025

(54) ELECTRICAL SWITCHING ELEMENT WITH STATUS INDICATOR AND KIT FOR SUCH AN ELEMENT

(71) Applicant: TE Connectivity Germany GmbH, Bensheim (DE)

(72) Inventors: Titus Ziegler, Berlin (DE); Oliver Steeg, Bensheim (DE); Michael Gudith, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 205 days.

(21) Appl. No.: 17/944,708

(22) Filed: Sep. 14, 2022

(65) Prior Publication Data

US 2023/0079711 A1 Mar. 16, 2023

(30) Foreign Application Priority Data

Sep. 15, 2021 (DE) ......................... 102021123868.4

(51) Int. Cl.

*H01H 47/00* (2006.01)
*H01H 50/02* (2006.01)
*H01H 50/18* (2006.01)
*H01H 50/44* (2006.01)
*H01H 71/04* (2006.01)

(52) U.S. Cl.

CPC .......... *H01H 47/002* (2013.01); *H01H 50/02* (2013.01); *H01H 50/18* (2013.01); *H01H 50/44* (2013.01); *H01H 2071/048* (2013.01)

(58) Field of Classification Search

CPC ....................... H01H 2071/048; H01H 47/002
USPC ............................. 335/126, 131, 205–207, 2
See application file for complete search history.

(56) References Cited

U.S. PATENT DOCUMENTS 3,579,159 A * 5/1971 Posey .................. H01H 36/004 335/205
4,450,427 A * 5/1984 Gareis ...................... H01F 7/16 324/251
4,792,651 A * 12/1988 Whiting ............... B01D 35/143 73/745
(Continued)

FOREIGN PATENT DOCUMENTS

DE 102007002176 A1 7/2008
DE 102010043352 A1 5/2012
(Continued)

OTHER PUBLICATIONS

Japanese Office Action dated Feb. 6, 2024 with English translation, corresponding to Application No. 2022-144271, 14 pages.
(Continued)

*Primary Examiner* — Alexander Talpalatski
(74) *Attorney, Agent, or Firm* — Barley Snyder

(57) ABSTRACT

An electrical switching element includes a housing, an armature moved by a coil arrangement, a contact arrangement switchable by the armature into at least two switching statuses, and a magnetic field sensor outputting a magnetic field-dependent switching signal representing the switching statuses. The armature, the contact arrangement, and the magnetic field sensor are arranged in the housing. The armature is arranged between the contact arrangement and the magnetic field sensor.

19 Claims, 2 Drawing Sheets

(56) References Cited

U.S. PATENT DOCUMENTS

| | | | | | |
|---|---|---|---|---|---|
| 5,257,014 | A * | 10/1993 | Zimmermann | G01B 7/02 137/554 |
| 5,483,214 | A * | 1/1996 | Perreira | H01H 36/002 335/205 |
| 5,523,684 | A * | 6/1996 | Zimmermann | H01F 7/1844 324/207.2 |
| 6,819,208 | B1 | 11/2004 | Peghaire et al. | |
| 8,289,026 | B2 | 10/2012 | Kell et al. | |
| 9,159,512 | B2 * | 10/2015 | Kodama | H01H 47/002 |
| 9,412,545 | B2 * | 8/2016 | Kubono | H01H 50/60 |
| 9,552,916 | B2 * | 1/2017 | Kato | H01F 7/1646 |
| 9,595,411 | B2 | 3/2017 | Shimizu et al. | |
| 10,115,512 | B2 | 10/2018 | Koch et al. | |
| 10,854,406 | B2 * | 12/2020 | Bobert | H01H 36/0013 |
| 11,170,956 | B2 * | 11/2021 | Koch | H01H 1/0015 |
| 11,170,961 | B2 * | 11/2021 | Minowa | H01H 50/04 |
| 2002/0057152 | A1 * | 5/2002 | Elferich | B60K 35/10 335/220 |
| 2003/0085784 | A1 * | 5/2003 | Weber | H01H 50/541 335/129 |
| 2007/0279163 | A1 * | 12/2007 | Schmid | E05C 19/166 335/78 |
| 2008/0192402 | A1 | 8/2008 | Mitlmeier et al. | |
| 2010/0060287 | A1 | 3/2010 | Keil et al. | |
| 2013/0113582 | A1 * | 5/2013 | Schiepp | F01L 1/047 335/228 |
| 2013/0335174 | A1 * | 12/2013 | Kodama | H01H 47/002 335/2 |
| 2015/0380145 | A1 | 12/2015 | Koch et al. | |
| 2016/0064172 | A1 * | 3/2016 | Kirbawy | H03K 17/97 335/207 |
| 2016/0181038 | A1 | 6/2016 | Shimizu et al. | |
| 2018/0308650 | A1 * | 10/2018 | Koch | H01H 50/641 |
| 2021/0249210 | A1 | 8/2021 | Grunack | |

FOREIGN PATENT DOCUMENTS

| | | | |
|---|---|---|---|
| DE | 102010063172 | A1 | 6/2012 |
| DE | 112014003554 | T5 | 5/2016 |
| DE | 102018120984 | A1 | 3/2020 |
| DE | 102018008846 | A1 | 5/2020 |
| JP | 2009026626 | A | 2/2009 |
| JP | 2009134993 | A | 6/2009 |
| JP | 2010129010 | A | 6/2010 |
| JP | 2010193709 | A | 9/2010 |
| JP | 2016027560 | A | 2/2016 |
| WO | 2012059418 | A1 | 5/2012 |
| WO | 2012080091 | A | 6/2012 |
| WO | 2020094885 | A1 | 5/2020 |

OTHER PUBLICATIONS

German Office Action, Application No. 102021123868.4, Dated: May 17, 2022, 6 pages.

French Search Report dated Jul. 26, 2023, corresponding to Application No. FR2209187, 8 pages.

Indian Examination Report dated Jul. 27, 2023, corresponding to Application No. 202244051928, 6 pages.

Japanese Office Action dated Nov. 7, 2023 with English translation, corresponding to Application No. 2022-144271, 8 pages.

Korean Office Action dated May 24, 2024 with English translation, corresponding to Application No. 10-2022-0115581, 11 pages.

* cited by examiner

ELECTRICAL SWITCHING ELEMENT WITH STATUS INDICATOR AND KIT FOR SUCH AN ELEMENT

CROSS-REFERENCE TO RELATED APPLICATIONS

This application claims the benefit of the filing date under 35 U.S.C. § 119(a)-(d) of German Patent Application No. 102021123868.4, filed on Sep. 15, 2021.

FIELD OF THE INVENTION

The present invention relates to an electrical switching element and to a kit for such an element.

BACKGROUND

Electrical switching elements, such as relays or contactors, are known from the prior art. They usually have an armature moved by a coil arrangement and allow the setting of at least one defined switching status, or two defined switching statuses, such as the closing or opening of a circuit. In the use of a switching element, it is desirable to be able to detect and determine, respectively, its switching status and faults that may occur.

SUMMARY

An electrical switching element includes a housing, an armature moved by a coil arrangement, a contact arrangement switchable by the armature into at least two switching statuses, and a magnetic field sensor outputting a magnetic field-dependent switching signal representing the switching statuses. The armature, the contact arrangement, and the magnetic field sensor are arranged in the housing. The armature is arranged between the contact arrangement and the magnetic field sensor.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
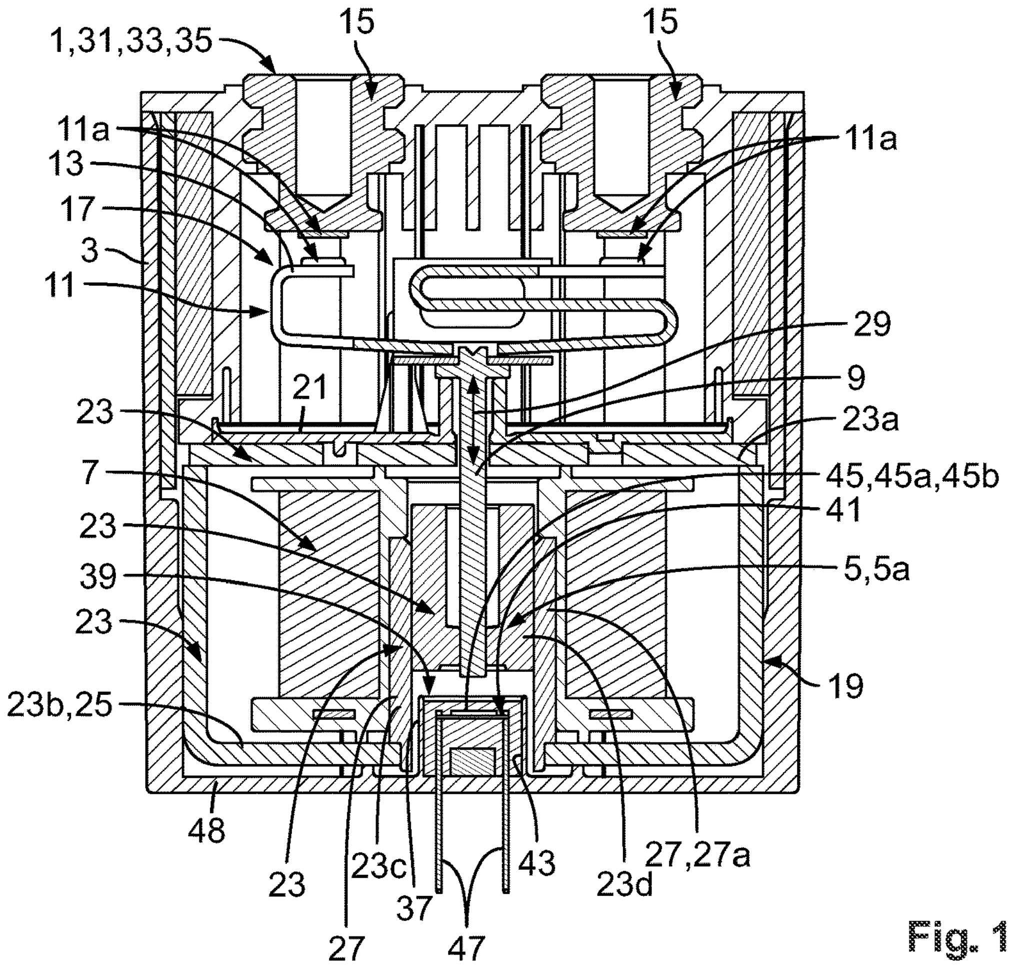
FIG. 1 is a sectional view of an electrical switching element according to an embodiment.

In the following, the present invention is explained exemplarily, making reference to the drawings, on the basis of an embodiment. Individual elements of the respective embodiment may be omitted or added to the embodiment in question, depending on whether this element is required for a particular case of use. The same reference numerals are used in the figures for elements corresponding to one another with respect to function and/or structural design. A repetition of the description of identical or similar elements in different embodiments is avoided, but differences in different embodiments are explicitly pointed out, where necessary.

FIG. 1 shows an electrical switching element 1 according to the present invention. This electrical switching element 1 comprises a housing 3, an armature 5, and a coil arrangement 7, which moves the armature 5. The electrical switching element 1 shown in FIG. 1 has a plunger **5*a*. A kit according to an embodiment comprises the components of the electrical switching element 1**.

The armature 5 has an axis 9 and a movement of the armature 5 is transmitted through this axis 9 to a contact arrangement 11. In the embodiment of the electrical switching element 1 shown in FIG. 1, the contact arrangement 11 comprises a contact bridge 13 with two contact pads **11*a*, which are designed for contacting contact pads 11*a* of power terminals 15**.

The electrical switching element 1 includes a switching chamber 17, which is spatially separated from a coil area 19 of the electrical switching element 1 by a separator element 21 and a first iron circuit element **23*a*, as shown in FIG. 1**.

In addition, as shown in FIG. 1, the coil area 19 includes a second iron circuit element **23*b* in the form of a yoke 25, a third iron circuit element 23*c*, and a fourth iron circuit element 23*d* in the form of the armature 5. These iron circuit elements 23*a* to 23*d* form an iron circuit 23. The iron circuit 23** represents a closed path for a magnetic flux and may also be referred to as a magnetic circuit.

In the embodiment of the electrical switching element 1 shown in FIG. 1, the third iron circuit element **23*c* is configured as a bush 27 that is arranged concentrically to the axis 9 of the armature 5. The bush 27 is a bearing bush 27*a* of the armature 5. The axis 9 extends longitudinally along a direction of movement 29 of the armature 5. The direction of movement 29 is identified by a double arrow. The armature 5 and the axis 9 connected thereto can be moved by the coil arrangement 7 in one of the two directions. In the embodiment shown, the electrical switching element 1 has two switching statuses 31, which correspond to the two end positions 33 of the movable system comprising the armature 5, the axis 9 and the contact arrangement 11. The contact arrangement 11 is switchable by the armature 5 into the two switching statuses 31. In FIG. 1, the electrical switching element 1 is shown at an open position 35**.

At least one switching status 31 of the contact arrangement 11 can be a stable status, into which the contact arrangement 11 moves or in which the contact arrangement 11 is, when the electrical switching element 1 is not activated. Such a stable status can be achieved e.g. due to magnetic attraction or by a return spring. The at least one further switching status can be metastable or astable and can only be assumed when the electrical switching element 1 is activated accordingly. The at least two switching statuses 21 can both be stable in another embodiment.

The bushing 27 is placed over a wall 37 of the housing 3 and, in addition, it is held in position by the yoke 25 and the coil arrangement 7. The wall 37 may also be referred to as a cylindrical collar **37*a* and will be described in more detail with reference to FIG. 2 and FIG. 3**.

Figure 2:
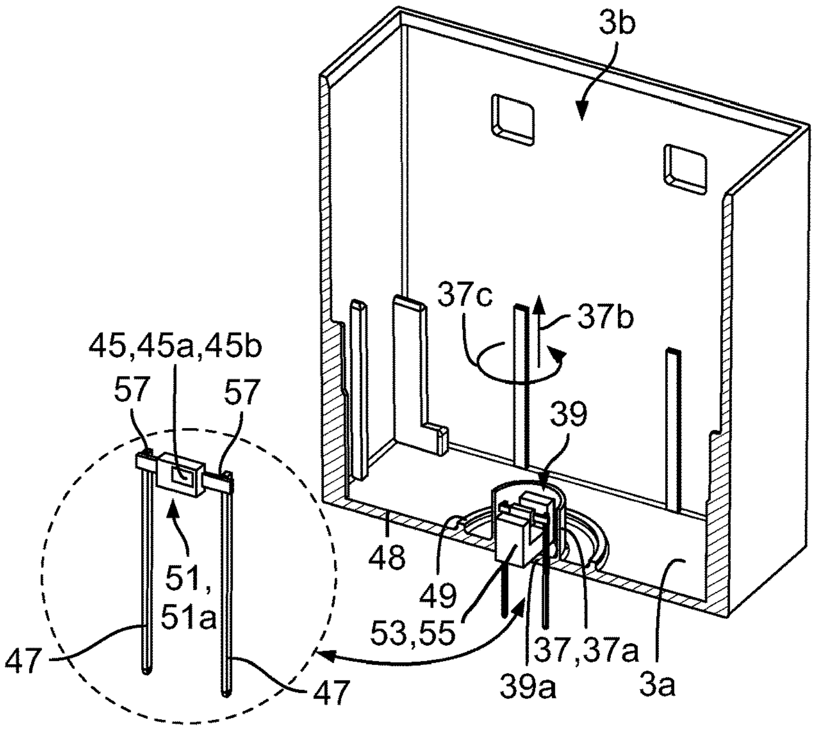
FIG. 2 is a sectional perspective view of an assembly of the electrical switching element.
Figure 3:
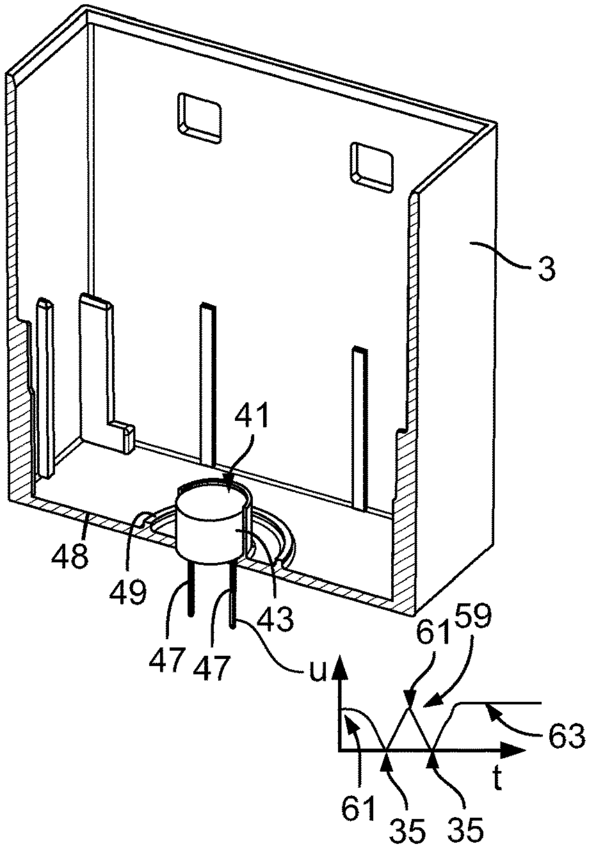
FIG. 3 is another sectional perspective view of the assembly of the electrical switching element.

For the sake of clarity, only the housing 3 of the electrical switching element 1 according to the present invention is shown in a sectional view in FIG. 2 and FIG. 3. Further elements, such as the armature 5 or the contact arrangement 11, are not shown in these figures.

The wall 37, and the cylindrical collar **37*a*, respectively, form a receptacle 39, in which a sensor device 41 is accommodated, as shown in FIGS. 2 and 3. The receptacle 39 shown is cylindrical and cup-shaped and opens towards an interior 3*b* of the housing 3. The wall 37 extends into the housing 3 from a wall 3*a* of the housing 3 in an extrusion direction 37***b*. The wall 37 is closed in itself, i.e. non-interrupted, in a circumferential direction 37*c*. The wall 37 can comprise individual wall sections, which each extend in the extrusion direction 37*b*, or it can be a continuous wall. A bottom 39*a* of the receptacle 39 is formed by the wall 3*a* of the housing. The size of the installation space required for the electrical switching element 1 is not increased by the wall 37 projecting into the housing 3. The extrusion direction 37*b* may be oriented parallel to an orientation of the axis 9 of the armature 5 and perpendicular to the wall 3*a* of the housing 3.

The wall 37 may be formed monolithically with the housing 3 and connected thereto. If the wall 37 consists of individual wall sections, also the latter can form such a cup-shaped receptacle 39. In this case, the cup-shaped receptacle 39 may not be fully surrounded by the wall sections in the circumferential direction, but may be surrounded by them sectionwise. When seen in the extrusion direction, the receptacle 39 can be circular or elliptical or rectangular. Other shapes are conceivable as well.

The bush 27 can be placed, at least sectionwise, over the wall 37. This allows the bush 27 to be centered with respect to the wall 37. In an embodiment, an outer contour of the wall 37 can be complementary to an inner contour of the bush 27. In another embodiment, the wall 37, the axis 9 of the armature 5 and the bush 27 are therefore arranged such that they are concentric to one another.

The sensor device 41, as shown in FIGS. 2 and 3, comprises a sensor housing 43, a magnetic field sensor 45, and sensor contacts 47. In embodiments of the electrical switching element according to the present invention which are not shown, the magnetic field sensor 45 alone may be accommodated in the receptacle 39. The receptacle 39 formed by the wall 37 accommodates the sensor device 41.

The magnetic field sensor 45 can be accommodated in the sensor housing 43. In particular, the magnetic field sensor 45 can be arranged, together with the sensor housing 43, in the housing 3 of the switching element, in the receptacle 39 in a form-fit manner for example. The magnetic field sensor 45, together with the sensor housing 43, can be fixed in position in the housing 3 of the switching element.

The contact arrangement 11 and the magnetic field sensor 45 are arranged in the housing 3. The armature 5 is arranged between the sensor device 41 and thus also between the magnetic field sensor 45 and the contact arrangement 11. The armature 5, the contact arrangement 11, and the magnetic field sensor 45 can be enclosed in particular by the housing 3. The armature 5 may have an arbitrary armature geometry and may be, for example, a plunger or a rocking armature.

The armature 5 arranged between the contact arrangement 11 and the magnetic field sensor 45 has the advantage that the magnetic field sensor 45 is spatially separated from the contact arrangement 11. The magnetic field sensor 45 can thus be arranged outside a switching chamber 17, in which the contact arrangement 11 is located. This is advantageous insofar as any arcs that may occur when the contact arrangement 11 is being switched cannot affect the magnetic field sensor 45. In addition, it is also possible to protect the magnetic field sensor 45 by such positioning against secondary effects, such as thermocycling, caused by the arcs. Another advantage of this kind of positioning is that measurement uncertainties can be avoided, which may occur due to so-called blowout magnets. These magnets are used to extend occurring arcs and thus extinguish them more quickly than would be the case without a blowout magnet. Measurement uncertainties due to a temperature drift and/or aging and/or a possible demagnetization of the blowout magnets through high short-circuit currents are also avoided by positioning the magnetic field sensor 45 in this way.

The magnetic field sensor 45 can be arranged and fastened, respectively, on stationary parts of the electrical switching element 1. In this way, a complicated fastening of the magnetic field sensor 45 on moving parts of the electrical switching element can be avoided. The magnetic field sensor 45 can be arranged concentrically to an axis 9 of the armature 5. In particular, the magnetic field sensor 45 can be arranged symmetrically on the axis 9 of the armature 5. The axis 9 of the armature 5 can connect the armature 5 with the contact arrangement 11, and a movement of the contact arrangement 11 along this axis 9 can take place.

In an embodiment, the magnetic field sensor 45 is arranged in the bush 27. In particular, the bush 27 can be a bearing bush 27*a* of the armature 5, which can be configured to guide the armature 5. The bush 27 of the armature 5 can consist of or be made of a magnetic material, so that a possible influence on the magnetic field sensor 45 by external magnetic fields can be reduced by this encasement of the magnetic field sensor 45. The magnetic material may be a ferromagnetic material, but the bush 27 may, alternatively or additionally, also contain a ferromagnetic material. The magnetic field sensor 45 can thus be arranged in particular in a bush or a sleeve belonging to the iron circuit 23 of the armature 5.

The magnetic field sensor 45 can be arranged in a position and/or orientation that is invariable and fixed with respect to the coil arrangement 11. Furthermore, the magnetic field sensor 45 can be rigidly connected to the coil arrangement 11.

The magnetic field sensor 45 can be spaced at different distances from the armature 5 in the at least two switching statuses 31 of the armature 5. The magnetic field sensor 45 is penetrated by a magnetic field. The characteristics of this magnetic field, such as the magnetic field strength, the direction and the distance of the magnetic field lines, depend on the distance of the magnetic field sensor 45 from the armature 5. These changes in the magnetic field detected by the magnetic field sensor 45 can also occur during (unintentional) fusing of the contact arrangement 11 by an arc, so that a defective status of the electrical switching element 1 can be detected.

The magnetic field sensor 45 may in particular be a distance sensor 45*a* and in an embodiment a Hall sensor 45*b*, permitting detection of the position of the armature 5 and/or the position and status of the contact arrangement 11 in a contact-free manner. The distance sensor 45*a* can thus detect a distance between the sensor 45*a* and the armature 5, and it is possible to detect at least two distances, which represent the at least two switching statuses 31 of the contact arrangement 11. With the Hall sensor 45*b*, a signal can be detected even if the magnetic field does not change, and that this sensor does not contain any magnetic materials (such as nickel or iron) and thus does not affect the magnetic field of the electrical switching element 1. The magnetic field sensor 45 will be described in more detail with reference to FIG. 2.

A raised annular support 49 as well as the wall 37 can be seen on a bottom 48 of the housing 3 in FIG. 2. The yoke 25 abuts on the raised annular support 49.

The magnetic field sensor 45 is part of an integrated circuit 51 shown in FIG. 2, so that, when a Hall sensor 45*b* is used as a distance sensor 45*a*, an integrated circuit 51 with Hall sensor 45*b*, or in short, a Hall IC 51*a*, is formed. The magnetic field sensor 45 is schematically indicated in an enlargement in the integrated circuit 51. The integrated circuit 51 is connected to the sensor contacts 47 mechanically and electrically by contact feet 57. The integrated circuit 51 may be potted and can thus be protected against environmental influences. An integrated circuit 51 has the advantage that a detected signal can be tapped on the integrated circuit 51 in an amplified and/or processed and/or converted form. If, for example, a Hall sensor 45*b* is used, the integrated circuit 51 can, by suitable further components, e.g. amplify and/or digitize a Hall voltage that can be output by the Hall sensor 45*b* and that represents the strength of the magnetic field.

The sensor device 41 shown in FIG. 2 further comprises a permanent magnet 55 as a sensor magnet 53, by which the Hall IC 51*a* can be operated in a linear range. In the linear range, a magnetic field-dependent switching signal 59 shown in FIG. 3, output by the magnetic field sensor 45, is linearly dependent on an applied magnetic field strength. The magnetic field sensor 45 can quantitatively and/or qualitatively detect a magnetic field present in the electrical switching element 1. Alternatively, the magnetic field sensor 45 can detect a change in the magnetic field present in the electrical switching element 1.

The switching signal 59 can be an analog or a digital switching signal. This switching signal 59 can be permanently readable or readable in response to triggering. In the simplest case, the switching signal 59 can represent a status of the switching element 1 by an analog voltage value. Alternatively, the switching signal 59 can, for example, also assume two different voltage values in binary form, where each voltage value can represent a switching status. In particular, the at least two switching statuses 31 can each be assigned unambiguously to a respective value of the switching signal 59.

The feature that the different switching statuses 31 of the switching element 1 are represented in the switching signal means that the magnetic field-dependent switching signal 59 can represent a respective one of the at least two switching statuses 31, but that the switching signal 59 can also represent each switching status of all other of the at least two switching statuses 31. The switching signal 59 can represent each switching status, but in each case only one switching status alone and not several switching statuses in combination.

The status of the switching element 1 can in particular be the switching status 31 or the functional status assumed by the contact arrangement 11 of the switching element 1, as well as a fault status of the electrical switching element 1.

The magnetic field-dependent switching signal 59 is shown schematically in FIG. 3. The switching signal 59 is shown merely by way of example and represents a voltage U plotted against the time t. Only by way of example, the switching signal 59 shown represents the open position 35 twice, a contact position 61 twice and—again merely by way of example and symbolically—a fault status 63 in which the contact pads 11*a* of the contact arrangement 11 have, unintentionally, been fused to one another.

In other embodiments of the electrical switching element according to the present invention, the magnetic field-dependent switching signal 59 can be output by the sensor device 41 in some other form, e.g. in a digital, binary or inverted form. The signal form shown here is schematic and exemplary and serves only to show that at least two switching statuses 31 can be distinguished. In the case shown, also a third switching status 31, here the fault status 63, can be distinguished from the other two switching statuses 31, viz. the open position 35 and the contact position 61.

The receptacle 39 formed in the housing 3 of the switching element in the interior of the housing 3 can be referred to as an accommodation pocket for the magnetic field sensor 45. The magnetic field sensor 45 can be received therein. In particular, the receptacle 39 can be configured complementarily to the sensor housing 43. The receptacle 39 and the sensor housing 43 can have a shape that allows the magnetic field sensor 45 to be inserted into the receptacle 39 in only one orientation. Such a principle can prevent the magnetic field sensor 45 from being received in the electrical switching element in an incorrect orientation. Especially when Hall sensors are used, orientation-related sign errors of the magnetic field-dependent switching signal 59 can be avoided in this way. Due to the arrangement of the receptacle 39 in the interior of the housing 3, the size of the installation space required for the electrical switching element is not increased and a known electrical switching element can be replaced by such an electrical switching element with status indicator in a simple manner and without any further modification of the receptacle of the electrical switching element.

Figure 4:
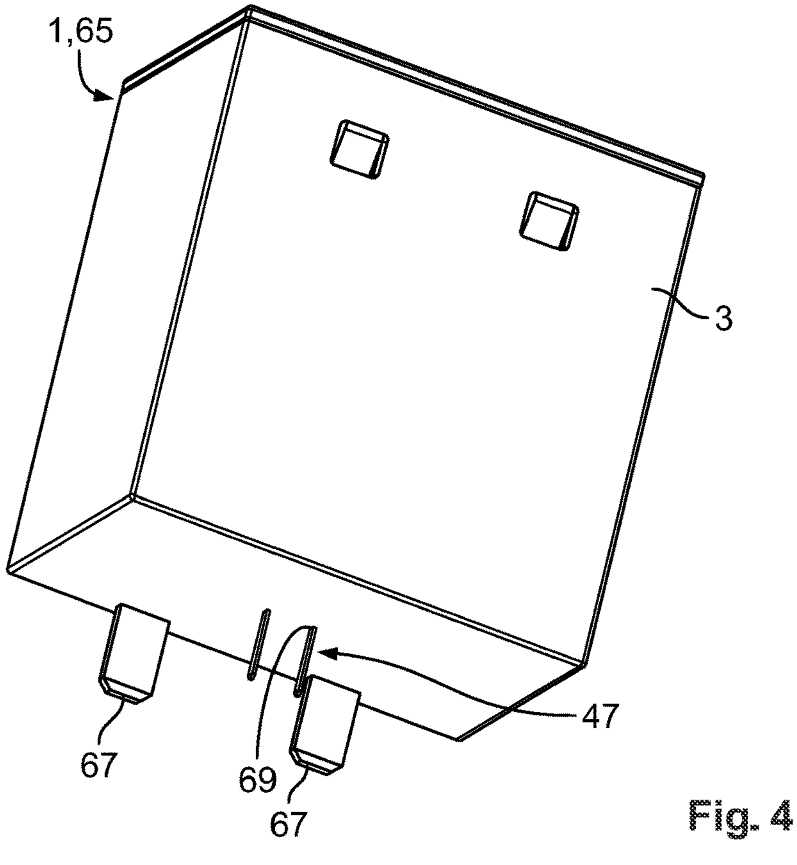
FIG. 4 is a perspective view of the electrical switching element.

FIG. 4 shows the electrical switching element 1 according to the present invention in an assembled state 65. The sensor contacts 47 of the magnetic field sensor 45 (concealed) project beyond the housing 3, so that the magnetic field-dependent switching signal 59 can be tapped from the outside. The sensor contacts 47 can be fixed in position in the housing 3 and, in particular, accommodated by a seal 69, thus forming a waterproof and/or gas-tight electrical switching element 1. In addition, the sensor contacts 47 may be potted into the housing 3 or inserted in a gas-tight and/or waterproof manner in a receptacle of the housing 3 for accommodating the sensor contacts 47.

Contact tabs 67 are used for electrically contacting the power terminals 15 (FIG. 1). The contact tabs 67 may also be provided with a seal. Alternatively, the contact tabs 67 are potted into the housing 3.

The electrical switching element 1 has a simplified structural design and a less failure-prone positioning of the magnetic field sensor 45. The magnetic field sensor 45 may be part of, or constitute, a status indicator. In an embodiment, already existing electrical switching elements can be supplemented by a status indicator according to the present invention, based on a magnetic field sensor 45. Their functionality can be extended in this way.

The electrical switching element 1 is a simpler and/or more space-saving and/or less expensive than solutions known from the prior art.

What is claimed is:

1. An electrical switching element, comprising:

a housing having a wall and a raised annular support both projecting into the housing in an extrusion direction, the wall forms a receptacle, the raised annular support is positioned around the wall;

an armature moved by a coil arrangement;

a contact arrangement switchable by the armature into at least two switching statuses; and a magnetic field sensor outputting a magnetic field-dependent switching signal representing the switching statuses, the armature, the contact arrangement, and the magnetic field sensor are arranged in the housing, the armature is arranged between the contact arrangement and the magnetic field sensor, the magnetic field sensor is arranged in a bush of the armature, the magnetic field sensor is accommodated in a sensor housing, the sensor housing is disposed in the receptacle and has a shape complementary to the receptacle.

2. The electrical switching element of claim 1, wherein the magnetic field sensor is a distance sensor.

3. The electrical switching element of claim 1, wherein the magnetic field sensor is a Hall sensor.

4. The electrical switching element of claim 1, wherein the magnetic field sensor is arranged in an integrated circuit.

5. The electrical switching element of claim 1, wherein the bush is a bearing bush of the armature.

6. The electrical switching element of claim 1, wherein the bush consists of a magnetic material.

7. The electrical switching element of claim 1, wherein the wall is closed in a circumferential direction around the extrusion direction.

8. The electrical switching element of claim 1, wherein the bush is placed over the wall.

9. The electrical switching element of claim 1, wherein the magnetic field sensor has a pair of sensor contacts projecting beyond the housing.

10. A kit for an electrical switching element, comprising:

a housing having a wall and a raised annular support both projecting into the housing in an extrusion direction, the wall forms a receptacle, the raised annular support is positioned around the wall;

an armature moved by a coil arrangement;

a contact arrangement switchable by the armature into at least two switching statuses; and a magnetic field sensor outputting a magnetic field-dependent switching signal representing the switching statuses, the armature, the contact arrangement, and the magnetic field sensor are arranged in the housing, the armature is arranged between the contact arrangement and the magnetic field sensor, the magnetic field sensor is arranged in a bush of the armature, the magnetic field sensor is accommodated in a sensor housing, the sensor housing is disposed in the receptacle and has a shape complementary to the receptacle.

11. The electrical switching element of claim 1, wherein the shape of the sensor housing permits insertion of the sensor housing into the receptacle in only one orientation.

12. The electrical switching element of claim 1, further comprising an iron circuit that forms a closed path for a magnetic flux and is positioned between the contact arrangement and the magnetic field sensor.

13. The electrical switching element of claim 12, wherein the iron circuit includes the armature, the bush, and a yoke positioned around the armature and the bush.

14. The electrical switching element of claim 4, wherein the integrated circuit is potted in the sensor housing.

15. The electrical switching element of claim 1, wherein the sensor housing is form fit in the receptacle.

16. The electrical switching element of claim 9, further comprising a seal positioned around each of the sensor contacts and sealing the sensor contacts with respect to the housing.

17. The electrical switching element of claim 1, further comprising a yoke abutting the raised annular support.

18. The electrical switching element of claim 1, wherein the wall projects further into the housing in the extrusion direction than the raised annular support.

19. The electrical switching element of claim 1, wherein the raised annular support is monolithically formed with the housing and the wall.

* * * * *